May 16, 1933.  J. HEKTNER  1,909,617
ROLLER BEARING AND CAGE
Filed Aug. 1, 1930
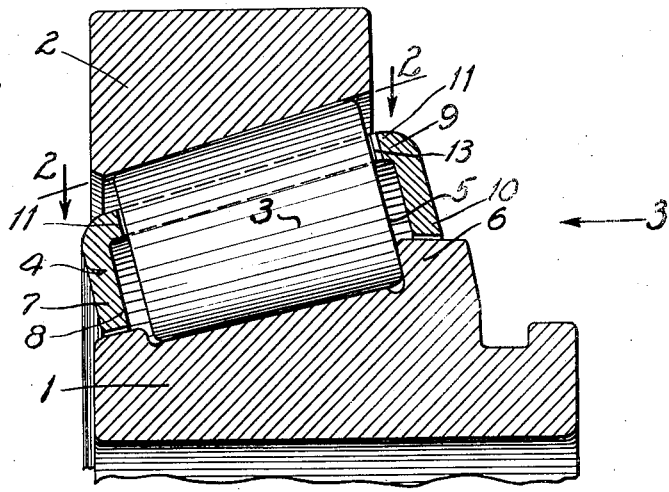
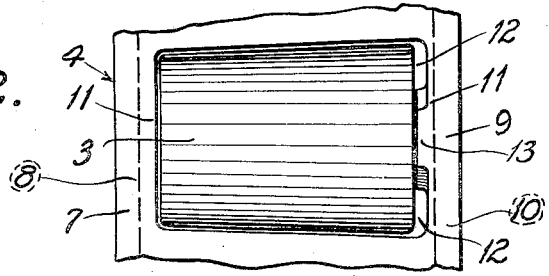
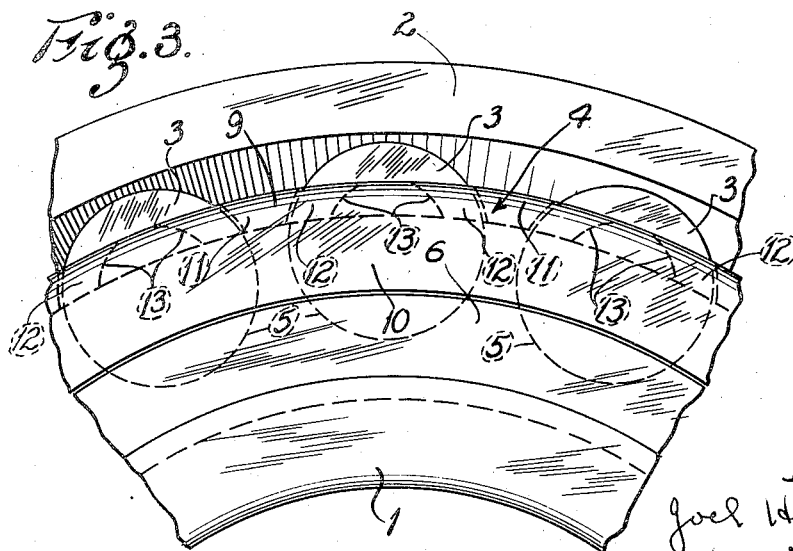
INVENTOR:
Joel Hektner,
by Carr and Carr & Gravely
HIS ATTORNEYS.

Patented May 16, 1933

1,909,617

UNITED STATES PATENT OFFICE

JOEL HEKTNER, OF CANTON, OHIO, ASSIGNOR TO THE TIMKEN ROLLER BEARING COMPANY, OF CANTON, OHIO, A CORPORATION OF OHIO

ROLLER BEARING AND CAGE

Application filed August 1, 1930. Serial No. 472,245.

My invention relates to roller bearings and cages therefor, particularly conical roller bearings; and has for its principal object a cage which engages the rollers and is accurately held in position without interfering with proper lubrication of the rollers, particularly the thrust portions thereof. The invention consists principally in a roller bearing cage that is provided with a projecting portion at one end that engages the middle portion only of the thrust end of a roller, being clear of the peripheral edge of said end of said roller, which end engages a rib on a race member. The invention further consists in the roller bearing and in the cage and in the parts and combinations and arrangements of parts hereinafter described and claimed.

In the accompanying drawing,

Fig. 1 is a sectional view of a bearing and cage embodying my invention,

Fig. 2 is a plan view of a portion of a cage showing a roller therein, looking in the direction of the arrows 2—2 in Fig. 1, and Fig. 3 is an end view looking in the direction of the arrow 3 in Fig. 1.

The drawing illustrates a conical roller bearing comprising a cone 1 or inner bearing member, a cup 2 or outer bearing member, conical rollers 3 therebetween, and a cage indicated generally by 4. The marginal portions of the large ends 5 of the conical rollers abut against a thrust rib 6 on the cone.

Particularly in the case of large bearings such as are used in railway cars, it is found that the heavy end thrust on the rollers 3 makes it difficult to keep the thrust ends thereof properly lubricated; and the present construction assists in the proper lubrication of the thrust ends of the rollers while at the same time providing for proper centering and positioning of the cage.

The cage 4 has an end ring 7 at its small end provided with an inturned radial flange 8 that closely encircles the small end of the bearing cone 1; and it has an end ring 9 at its large end that is also provided with an inturned radial flange 10 that closely encircles the large end of the cone 1. The end rings are connected by bridges 11 which, together with the end rings, form pockets for the rollers 3. The bridges 11 and the small end ring 7 have straight surfaces that engage the rollers, but the large end ring 9 has notches or indentations 12 in the corners of each pocket, leaving a raised or projecting middle portion 13 that has a straight edge surface making extensive contact flatwise with the middle portion of the large or thrust end 5 of each roller. The sides of the bridges 11 engage the rollers throughout their length. The small end ring 7 is normally clear of the small ends of the rollers.

The above described construction has important advantages. The raised or projecting portions 13 of the large end rings engage the middle portions of the thrust ends 5 of the rollers so as to exert a steadying effect on the rollers and so that the cage itself is properly guided. At the same time, the edge of the thrust end 5 of each roller (which is the portion that engages the thrust rib and requires lubrication) is entirely out of contact with the large end ring. Thus there is no tendency for oil to be scraped off this thrust edge by the cage. In addition, the notches enable oil to pass into the cage and onto the thrust ends of the rollers when the rollers pass through an oil reservoir at the bottom part of their circular movement. This is particularly true of constructions wherein the inner bearing member is mounted on a stationary axle and the outer bearing member rotates, passing through a reservoir of oil. If the large end ring made contact entirely across the thrust ends of the rollers, it would be difficult for oil to get access to the large ends of the rollers.

What I claim is:

1. A roller bearing cage comprising end rings connected by bridges forming roller pockets, one end ring having projecting portions with flat faces adapted to engage the middle portions only of flat ended rollers mounted in said pockets.

2. A cage for conical roller bearings comprising a conical shell having end rings and bridges forming roller pockets, the ring at the large end of said shell having projecting portions with flat faces engaging the middle portions only of the large ends of rollers in said pockets, the marginal portions of the large ends of said rollers being free from contact with said large end ring.

3. A cage for conical roller bearings comprising a conical shell having end rings and bridges forming roller pockets, the ring at the large end of said shell having projecting portions with flat faces each engaging the middle portion only of the large end of a roller in said pocket and being recessed, the marginal portions of the large ends of said rollers being free from contact with said large end ring.

4. A conical roller bearing comprising conical inner and outer bearing members, a thrust rib at the large end of the race of one of said bearing members, conical rollers between said bearing members, the marginal portion of the large end of each roller abutting against said thrust rib and a cage for said rollers, said cage having portions making extended flatwise contact with the middle portions of said large ends of said rollers, but being clear of said marginal portions of said large ends.

5. A conical roller bearing comprising a conical inner bearing member having a thrust rib at its large end, a conical outer bearing member, conical rollers therebetween abutting at their large ends against said thrust rib, said large ends having flat middle portions and a conical cage for said rollers comprising end rings connected by bridges forming roller pockets, the larger of said end rings having projecting portions each making extended contact with the middle portion of the large end of a roller and being clear of the marginal portion of said large end.

6. A conical roller bearing comprising a conical inner bearing member having a thrust rib at its large end, a conical outer bearing member, conical rollers therebetween abutting at their large ends against said thrust rib, said large ends having flat middle portions and a conical cage for said rollers comprising end rings connected by bridges forming roller pockets, the larger of said end rings having projecting portions making extended contact with the middle portion of the large end of each roller and being clear of the marginal portion of said large end, said end ring having portions closely encircling said inner bearing member.

Signed at Canton, Ohio, this 28 day of July 1930.

JOEL HEKTNER.